United States Patent
Barbu et al.

(10) Patent No.: US 11,800,322 B2
(45) Date of Patent: Oct. 24, 2023

(54) SIGNALLING FOR POSITIONING LATENCY CONTROL

(71) Applicant: NOKIA SOLUTIONS AND NETWORKS OY, Espoo (FI)

(72) Inventors: Oana-Elena Barbu, Aalborg (DK); Ryan Keating, Chicago, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 54 days.

(21) Appl. No.: 17/301,830

(22) Filed: Apr. 15, 2021

(65) Prior Publication Data
US 2022/0337971 A1  Oct. 20, 2022

(51) Int. Cl.
*H04W 24/00* (2009.01)
*H04W 4/029* (2018.01)
*H04W 24/02* (2009.01)

(52) U.S. Cl.
CPC ........... *H04W 4/029* (2018.02); *H04W 24/02* (2013.01)

(58) Field of Classification Search
CPC .............................. H04W 4/029; H04W 24/02
See application file for complete search history.

(56) References Cited

U.S. PATENT DOCUMENTS

| | | |
|---|---|---|
| 2018/0317123 A1 | 11/2018 | Chen et al. |
| 2019/0053010 A1 | 2/2019 | Edge et al. |
| 2019/0182665 A1 | 6/2019 | Edge |
| 2020/0259683 A1 | 8/2020 | Manolakos et al. |
| 2022/0060853 A1* | 2/2022 | Gummadi ............. H04W 4/025 |
| 2022/0116903 A1* | 4/2022 | Fakoorian ........... H04W 64/003 |

FOREIGN PATENT DOCUMENTS

| | | |
|---|---|---|
| CN | 111867109 A | 10/2020 |
| WO | WO-2022084944 A1 * | 4/2022 |

OTHER PUBLICATIONS

3GPP RAN WG2 Meeting #111-e, R2-2007587; "End-to-End Latency Reduction for DL/UL Positioning"; E-meeting; Aug. 17-28, 2020; 4 pages.
3GPP TSG RAN WG1 Meeting #103-e, R1-2009314; "FL Summary for Potential Positioning Enhancements", E-meeting; Oct. 26-Nov. 13, 2020; 55 pages.
(Continued)

*Primary Examiner* — Erika A Washington
(74) *Attorney, Agent, or Firm* — Brake Hughes Bellermann LLP (57) ABSTRACT

Improved techniques of reducing latency in UL positioning include generating a priority indication by the LMF for all UE requiring UL positioning. For example, an LMF can generate a priority list identifying UEs within a network that may be considered by a serving network node (gNB) for positioning prioritization. In some implementations, the serving gNB indicates that prioritizing all of the identified UEs would require more network resources than are available. In such a case, the LMF obtains latency measurement values for TRPs in the network. Based on the latency measurement values obtained, the LMF performs a configuration operation on at least one of the TRPs to reduce the UL positioning latency to an acceptable value.

20 Claims, 6 Drawing Sheets

(56) References Cited

OTHER PUBLICATIONS

3GPP TSG RAN WG1 Meeting #103-e, R1-2007577; "Positioning Enhancement in Rel-17", E-meeting; Oct. 26-Nov. 13, 2020; 17 pages.
International Search Report and Written Opinion for International Application No. PCT/EP2022/056121, dated Jul. 13, 2022, 16 pages.
3GPP TSG RAN WG 1 #103-e, R1-2008491; "Discussion on Potential Positioning Enhancements"; Agenda Item: 8.5.3; Source: InterDigital Inc.; eMeeting, Oct. 26-Nov. 13, 2020; 8 pages.
Fischer, Sven; "Chapter 15: 5G NR Positioning: Fundamentals and Standards" in "5G and Beyond: Fundamentals and Standards"; Jan. 1, 2021; Springer International Publishing; 16 pages.
3GPP TS 36.305 V16.2.0; "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 16)"; Oct. 2, 2020; 92 pages.
3GPP TSG RAN WG1 #103-e, R1-2008301; "Views on Potential Positioning Enhancements"; Agenda Item: 8.5.3; Source: Nokia, Nokia Shanghai Bell; Shanghai; Oct. 16, 2020; 13 pages.
3GPP TSG RAN WG1 Ad-Hoc Meeting 1901, R1-1900311; "NR RAT-Dependent UL Positioning"; Agenda: 7.2.10.1.2; Source: CATT; Taipei; Jan. 21-25, 2019; 10 pages.

* cited by examiner

SIGNALLING FOR POSITIONING LATENCY CONTROL

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, from a location management function (LMF) of a network, user equipment (UE) priority indication data representing a list of proposed priority levels corresponding to a set of UEs being served requiring positioning data from the network. The method further includes, after receiving the UE priority indication data, generating UE priority grant data indicating, for each of the set of UEs being served, whether there are sufficient resources to prioritize a transmission of a positioning signal by which the network may determine a position of that UE according to the proposed priority level corresponding to that UE.

According to an example implementation, an apparatus includes at least one processor and at least one memory including computer program code, the at least one memory and the computer program code configured to, with the at least one processor, cause the apparatus at least to receive, from a location management function (LMF) of a network, user equipment (UE) priority indication data representing a list of proposed priority levels corresponding to a set of UEs being served requiring positioning data from the network. The at least one memory and the computer program code are further configured to, with the at least one processor, cause the apparatus at least to, after receiving the UE priority indication data, generate UE priority grant data indicating, for each of the set of UEs being served, whether there are sufficient resources to prioritize a transmission of a positioning signal by which the network may determine a position of that UE according to the proposed priority level corresponding to that UE.

According to an example implementation, an apparatus includes means for receiving, from a location management function (LMF) of a network, user equipment (UE) priority indication data representing a list of proposed priority levels corresponding to a set of UEs being served requiring positioning data from the network. The apparatus also includes means for, after receiving the UE priority indication data, generating UE priority grant data indicating, for each of the set of UEs being served, whether there are sufficient resources to prioritize a transmission of a positioning signal by which the network may determine a position of that UE according to the proposed priority level corresponding to that UE.

According to an example implementation, a computer program product includes a computer-readable storage medium and storing executable code that, when executed by at least one data processing apparatus, is configured to cause the at least one data processing apparatus to receive, from a location management function (LMF) of a network, user equipment (UE) priority indication data representing a list of proposed priority levels corresponding to a set of UEs being served requiring positioning data from the network. The executable code, when executed by at least one data processing apparatus, is also configured to cause the at least one data processing apparatus to, after receiving the UE priority indication data, generate UE priority grant data indicating, for each of the set of UEs being served, whether there are sufficient resources to prioritize a transmission of a positioning signal by which the network may determine a position of that UE according to the proposed priority level corresponding to that UE.

According to an example implementation, a method includes transmitting, to a serving network node of a network, user equipment (UE) priority indication data representing a list of proposed priority levels corresponding to a set of UEs being served by the serving network node and requiring positioning data from the network. The method further includes receiving, from the serving network node, UE priority grant data indicating, for each of the set of UEs being served by the serving network node, whether there are sufficient resources for the serving network node to prioritize a transmission of a positioning signal by which the network may determine a position of that UE according to the proposed priority level corresponding to that UE.

According to an example implementation, an apparatus includes at least one processor and at least one memory including computer program code, the at least one memory and the computer program code configured to, with the at least one processor, cause the apparatus at least to transmit, to a serving network node of a network, user equipment (UE) priority indication data representing a list of proposed priority levels corresponding to a set of UEs being served by the serving network node and requiring positioning data from the network. The at least one memory and the computer program code are further configured to receive, from the serving network node, UE priority grant data indicating, for each of the set of UEs being served by the serving network node, whether there are sufficient resources for the serving network node to prioritize a transmission of a positioning signal by which the network may determine a position of that UE according to the proposed priority level corresponding to that UE.

According to an example implementation, an apparatus includes means for transmitting, to a serving network node of a network, user equipment (UE) priority indication data representing a list of proposed priority levels corresponding to a set of UEs being served by the serving network node and requiring positioning data from the network; and means for receiving, from the serving network node, UE priority grant data indicating, for each of the set of UEs being served by the serving network node, whether there are sufficient resources for the serving network node to prioritize a transmission of a positioning signal by which the network may determine a position of that UE according to the proposed priority level corresponding to that UE.

According to an example implementation, a computer program product includes a computer-readable storage medium and storing executable code that, when executed by at least one data processing apparatus, is configured to cause the at least one data processing apparatus to transmit, to a serving network node of a network, user equipment (UE) priority indication data representing a list of proposed priority levels corresponding to a set of UEs being served by the serving network node and requiring positioning data from the network; and receive, from the serving network node, UE priority grant data indicating, for each of the set of UEs being served by the serving network node, whether there are sufficient resources for the serving network node to prioritize a transmission of a positioning signal by which the network may determine a position of that UE according to the proposed priority level corresponding to that UE.

The details of one or more examples of implementations are set forth in the accompanying drawings and the description below. Other features will be apparent from the description and drawings, and from the claims.

DETAILED DESCRIPTION

Figure 1:
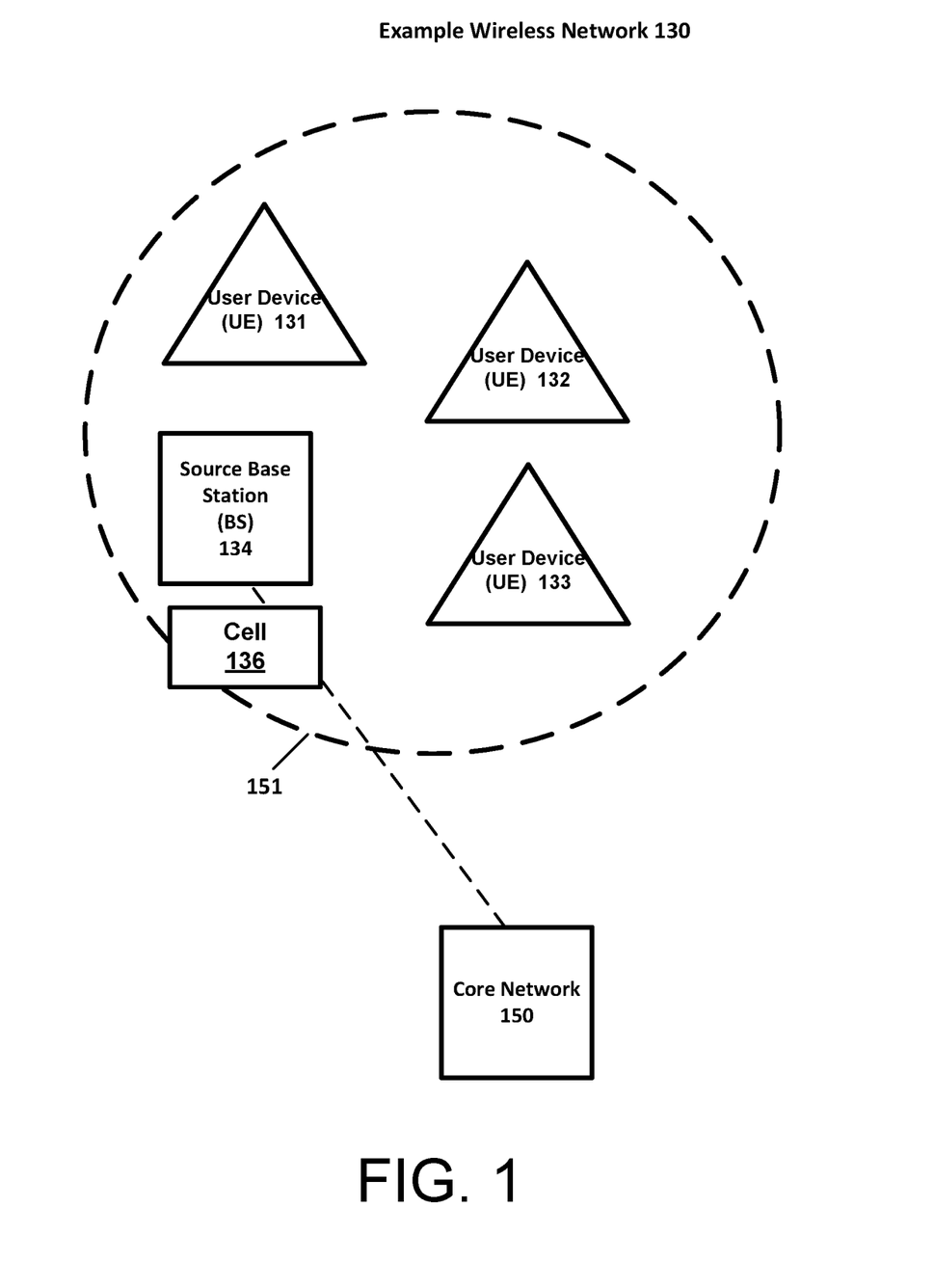
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) also may be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Various nodes, applications, and/or gNBs, may ask the gNB or a LMF (location management function located in core network) to obtain a location of a UE. Location of a UE can be performed using various techniques, that usually rely on a signal (e.g., phase measurement) of received positioning reference signals from at least 3 transmitters (PRS signal sources). For example, a self-driving service, may need to constantly (e.g., every 100 ms) know an exact location of each of its self-driving cars as part of its taxicab service. Or an employer may wish to track employee badges, shipment containers, or other important objects, etc. Thus, tracking of objects is important, e.g., determining location of a UE. Many applications or nodes may need to know a location of a UE.

Positioning reference signals are generally any reference signals (which can be DL reference signals transmitted by gNB, or UL reference signals transmitted by UE), that can be used for positioning a UE. For example, gNBs may transmit DL PRS signals, and the UE may perform measurements on each of these received PRS signals (e.g., UE may perform correlation to detect a peak, to detect presence of the received signal, and then detect a delay of the received PRS signal), and then may report that measured phase to a gNB. This may be done for multiple PRS signals received by UE from different gNBs (from different PRS signal transmitters). UE may report these signal measurements to LMF (a positioning control entity in core network, known as location management function), where the LMF may then report the UE location to some application or gNB that may have requested location of that UE. Or UE may report these signal measurements to its serving gNB, which may determine UE location. Alternatively, if UE knows location of various gNB/PRS transmitters, the UE may determine its own location based on these PRS signal measurements of at least 3 DL PRS signals received from gNBs or nodes, and then UE may then report its location to gNB or LMF.

In the UL direction, the UE may transmit UL PRS signals, e.g., Sounding reference signals, which may be received by multiple gNBs, e.g., such as serving gNB and other non-serving gNBs. Each of these gNBs may perform signal (e.g., delay) measurements on received SRS signals (similar to above), and these gNBs may report these signal measurement to the LMF or to a gNB, which may then estimate UEs location based on these multiple signal measurements (e.g., signal measurements measured at three or more locations.

In conventional UL positioning, UEs need to be configured by the serving gNB to transmit SRS signals according to a UE-specific time-frequency allocation. In particular, the gNB need to decide on:

A comb size to dimension the frequency allocation.
A repetition pattern in time domain to set the number of consecutive symbols occupied by the SRS.
A periodicity of the SRS transmission, i.e., how often in time is an SRS resource scheduled, etc.

The configuration should ensure that no two SRS transmissions overlap in code, time, frequency, or space domains, so that the inter-UE interference is minimized. For densely populated cells, i.e., many UE requiring UL positioning, configuring orthogonal SRS transmissions in time introduces unacceptable latencies for some UEs, since:

The UEs should wait their turn to transmit SRS in an empty slot.
The UEs should repeat the SRS transmission so that sufficient number (e.g., more than 3) of TRPs detect the SRS with high enough confidence.

The problem with conventional UL positioning becomes exacerbated at higher carrier frequencies, where each TRP needs to sweep the spatial dimension with all the available receive (RX) beams to make sure it captures UE signals from all directions. This means that the TRP should do the following:

Listen in each direction, i.e., with each RX beam, for a sufficiently long amount of time, T-per-beam.
Switch between beams, incurring a delay of, e.g., T-switch >3 ms.
Redo 1 and 2 until enough SRS measurements have been collected from all UEs, i.e., all UEs have been detected and their positioning measurements have been performed with sufficient accuracy.

Figure 2:
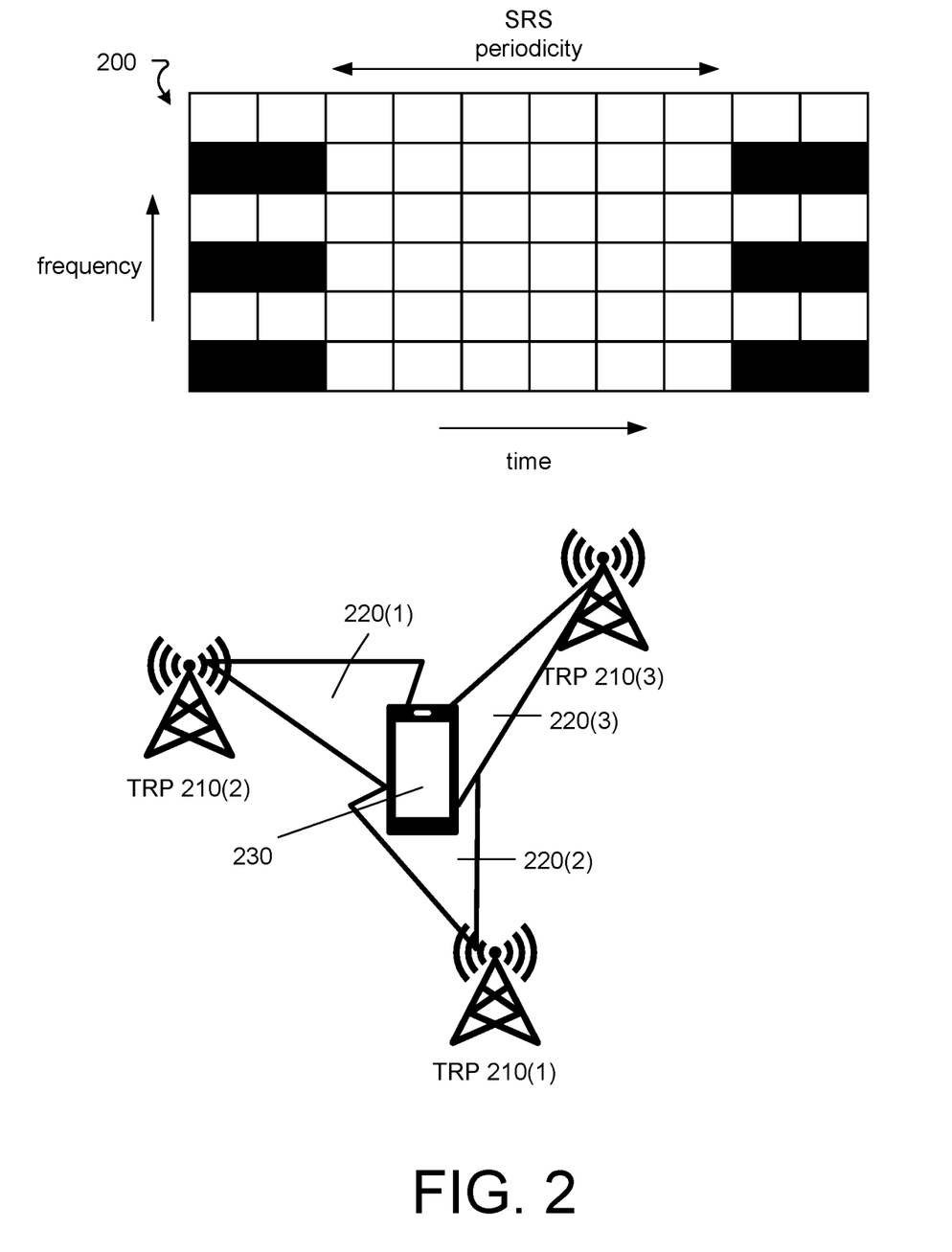
FIG. 2 is a diagram illustrating latency in uplink (UL) positioning, according to an example implementation.

FIG. 2 illustrates an example conventional UL positioning scenario 200: a latency sensitive UE may have been pre-configured with an SRS periodicity of P=50 subframes (SF). Assume the UE can tolerate a positioning latency of 100 ms. Three TRPs are able to detect the UE as indicated in the figure, i.e., TRP 2 and 3 hear the UE with beams 2.A and 3.B respectively.
TRP 1 hears the UE with beam 1.C
Since the channel conditions are poor towards TRP1, TRP1 needs to collect at least X=10 SRS occurrences. This means that TRP1 needs to listen with receive beam 1.C for the SRS for a duration PX=500 SF. TRP1 however has:
a beam duration T-beam=10 SF and
a beam switch time T-switch=1 SF.
A total number of RX beams R=10 which it needs to sweep through.

This means that TRP 1 cycles once through all its beams in a time T=R(T-beam+T-switch)=110 SF, time in which it has measured the UE only once. It needs however to collect X measurements, which means that TRP 1 can produce a positioning measurement for the UE after XT=1100 SF. TRP 1 alone introduces a latency of 1100 ms which is not tolerated by the UE.

In contrast to the above-described conventional UL positioning scenarios, improved techniques of reducing latency in UL positioning include generating a priority indication by the LMF for all UE requiring UL positioning. For example, an LMF can generate a priority list identifying UEs within a network that may be considered by a serving network node (gNB) for positioning prioritization. In some implementations, the serving gNB indicates that prioritizing all of the identified UEs would require more network resources than are available. Subsequently, the LMF obtains latency measurement values for TRPs in the network. In some implementations, the serving gNB obtains the latency measurement values even if the serving gNB accepts the prioritization. Based on the latency measurement values obtained, the LMF performs a configuration operation on at least one of the TRPs to reduce the UL positioning latency to an acceptable value.

Advantageously, such a priority indication can reduce latency to the point at which it may be tolerated by a UE.

The problem depicted in FIG. 2 can be addressed in various ways, depending on the conditions in the network at the time of the positioning request. The alternatives presented herein may use novel signalling among various network entities and the UEs to optimize for latency either the SRS transmission, the SRS beamed reception or both.

Figure 3:
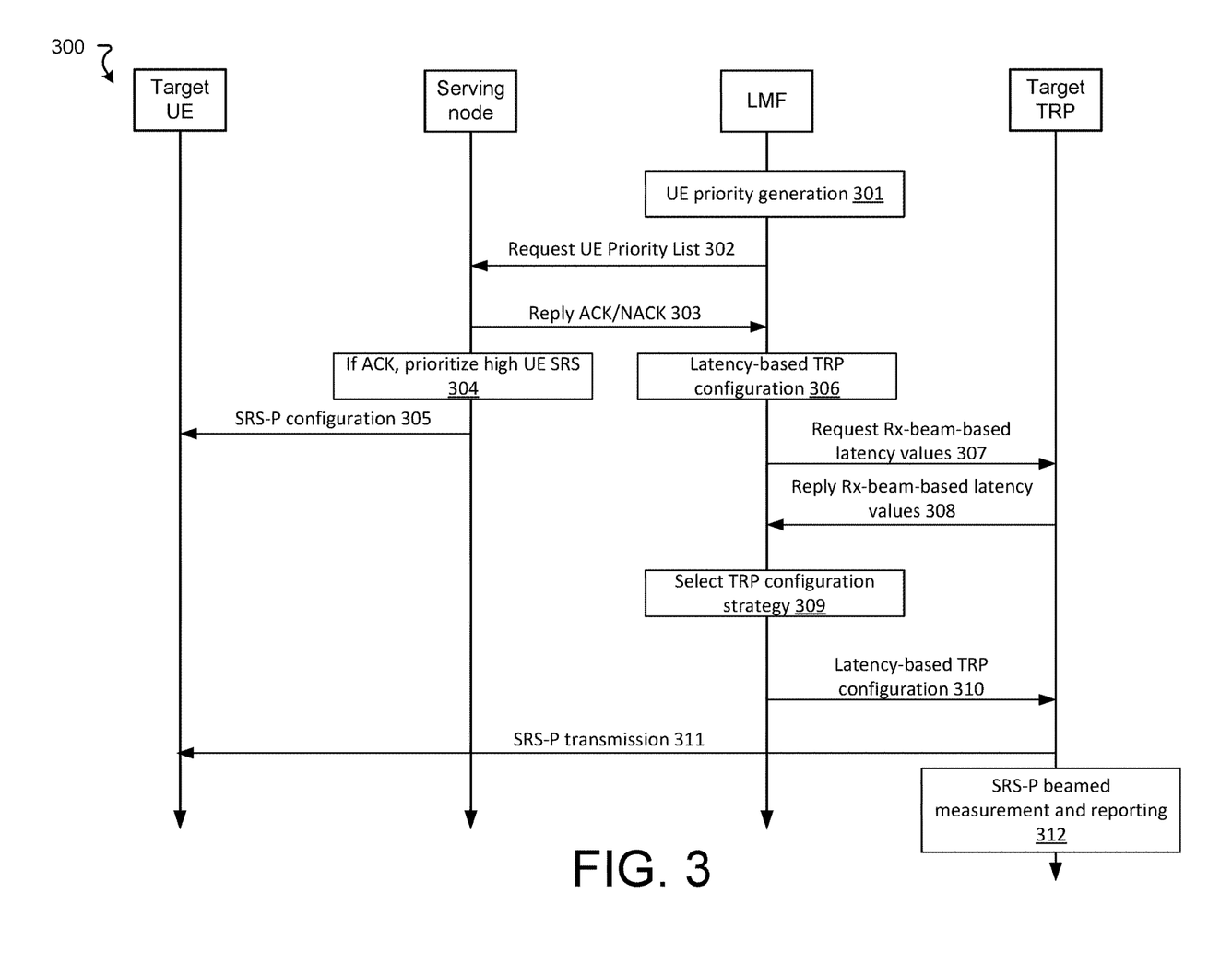
FIG. 3 is a sequence diagram illustrating a process of reducing latency in UL positioning, according to an example implementation.

FIG. 3 is a sequence diagram illustrating a process 300 of reducing latency in UL positioning.

At 301, the LMF computes a UE priority list for all UE requiring UL positioning. The prioritization is implementation-specific. For example, in some implementations, the LMF computes a UE positioning priority using the latency requirement of the application requiring the UE localization, the UE battery life and or type, etc. To obtain the list, the LMF may use the latency requirements of the UE, the accuracy of past location estimates, etc.

In some implementations, the priority indication can be set as a binary flag (1—high priority) or as a multiclass indicator. In some implementations, the multiclass indicator has values of MEDIUM (0), LOW (−1), and HIGH (1). The multiclass indicator may be obtained by the LMF by corroborating the latency requirement of the UE, the accuracy of its past position estimates, UE type, velocity, etc. Note that this priority indication is different than the UE priority of transmitting SRS-Position (SRS-P) if it collides with other signals/channels.

At 302, having prioritized the UEs, the LMF transmits the priority list to each serving gNB, indicating at least a UE identifier and the priority indication for each UE in the list.

At 303, the serving gNB evaluates the list, its current UE load and, its own radio resource management (RRM), and traffic types, and decides whether it can prioritize the SRS transmission for the high priority UEs. The serving gNB sends back to the LMF a binary indication on whether it has accepted the UE prioritization request (ACK) or not (NACK): ACK if it can implement the desired UE priority. In this case, the serving gNB allocates SRS-for-positioning to the UEs accordingly and the UL positioning session takes place as per current standard; NACK otherwise. The SRS prioritization may include, e.g.:
  reducing the SRS periodicity, i.e., densifying the SRS time allocation; or
  increasing the SRS repetition number and decreasing the comb size to ensure more dense time-frequency SRS allocation, etc.

At 304, in response to the serving gNB being able to implement the desired UE priority, the serving gNB allocates SRS-p to the UEs accordingly and the UL positioning session takes place as per current standard, i.e., 3GPP LPP or NRPPa standard specifications.

At 305, the serving gNB sends SRS-p configuration information to a UE it is serving according to the prioritization information for which the serving gNB sent the LMF an ACK.

At 306, in response to the serving gNB not being able to implement the desired UE priority (i.e., the LMF receives a NACK from the serving gNB), the LMF may activate the fallback solution which requires UE prioritization by the target TRPs. In this case, the LMF needs to coordinate the SRS beamed reception at the various receiving TRPs involved in the UL positioning.

At 307, either before 301, or after 303, the LMF requests from the target TRPs their RX configuration of SRS-p. The configuration may include at least:
  a number of RX beams each TRP has, i.e., R defined above,
  a switch time between beams T-switch, or
  a RX beam duration T-per-beam.

At 308, the target TRPs send the LMF their RX configuration of SRS-p.

At 309, The LMF uses the RX configuration sent by each TRP to compute a TRP-induced latency for that TRP. If this latency is not tolerable for the priority UEs, the LMF may either:
  I. Send the UE priority list (containing the latency requirements) directly to the target TRPs, for the latter to perform own RX beam reconfiguration. Note that in current rel. 16, TRPs are not informed about the QoS requirements of the UEs.
  II. Discard the TRPs with intolerable latency. In this case the LMF may update the MeasurementRequest message to one or more TRPs.
  III. Combine I) and II). The advantage of this approach is that the LMF (having an overview of all TRPs latencies) can perform both a UE prioritization at TRP X, but also a TRPs prioritization, so that TRPs with large associated latencies may not be required to measure high priority UEs.
  IV. Compute and send back to the TRPs an update for a new RX beam duration and optionally a RX beam priority list.

The LMF can estimate a TRP-induced latency and can identify the problematic TRPs, i.e., those with intolerable latency. Then, the LMF may signal to these TRPs either:
  1) The UE ID and the priority list, as in step 2, and let each TRP decide how to schedule its own RX beams in time and spatial domains.
    a) For example, the TRP may decide to use the RX beams necessary to receive a high priority UE 1 in slot 1 first and then wait to measure the SRS from a lower priority UE 2 in slot 2.
    b) In the case of high network load the TRP may determine to use the RX beam which can measure the highest number of high priority UEs first and then switch to beams with lower numbers of high priority UEs. In this was the latency will be minimized for the largest number of high priority UEs.
  2) An updated (e.g., larger) value for T-per-beam and additionally/optionally a "likely RX beam" list. The TRP may implement the updated T-per-beam for a selected set/all of RX beams, and skip other beams that are less likely to hear any positioning signals. The method through which the TRP implements RX beam prioritization is also out of scope of this IR.
  3) The LMF may also determine that the latency for a particular TRP will be too large to tolerate and remove that TRP for the list if it expects that the other target TRPs will be sufficient to meet the positioning accuracy requirements.

At 310, the LMF transmits a latency-based TRP configuration to the TRPs that have been determined to have a tolerable latency according to the beam schedule determined above.

At 311, the TRPs transmit SRS-p signals to the high priority UEs to commence UL positioning measurements.

At 312, the TRPs perform reporting on the UL positioning measurements to communicate the positions of the UEs within the network.

Figure 4:
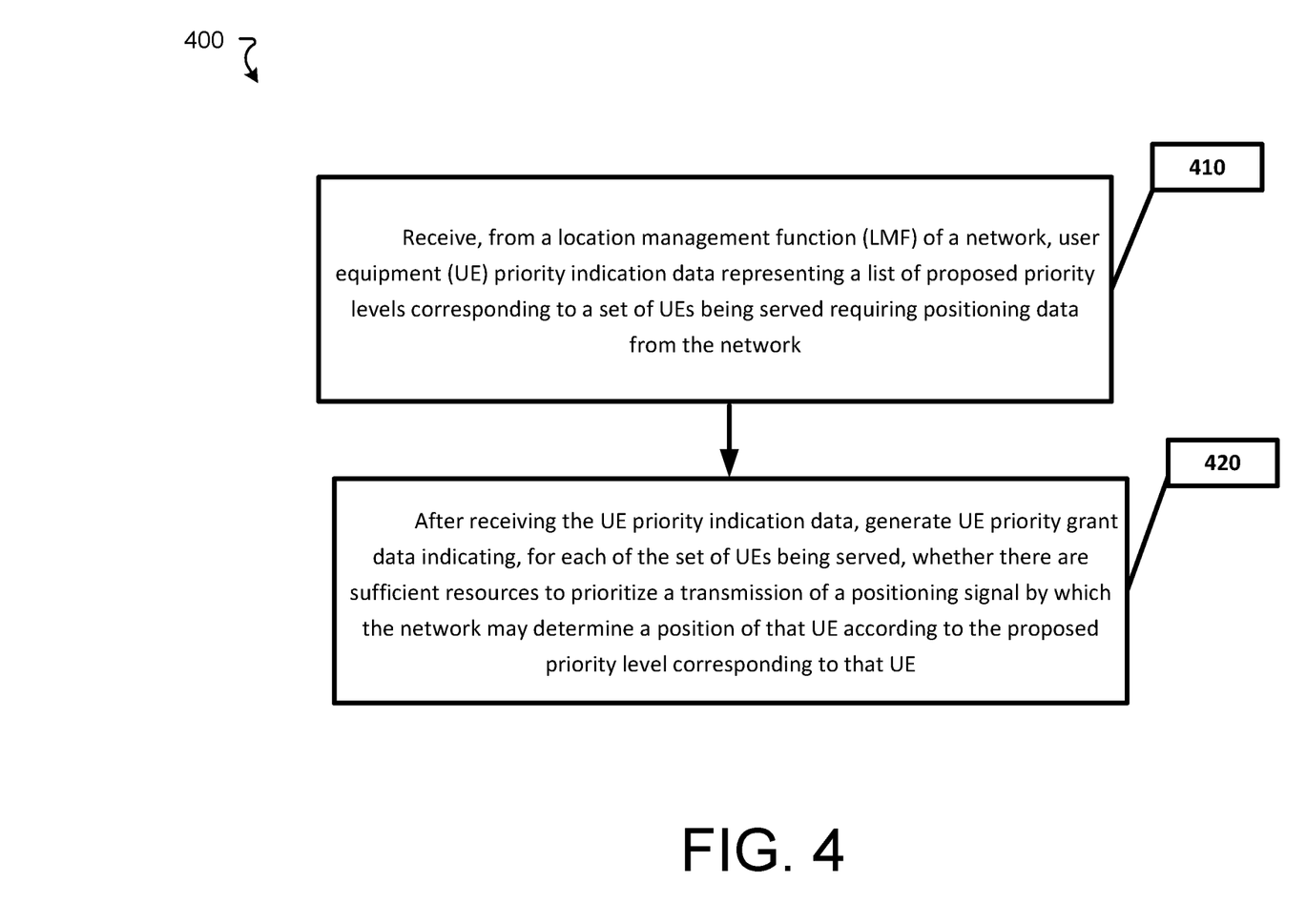
FIG. 4 is a flow chart illustrating a process of reducing latency in UL positioning according to an example implementation.

Example 1-1: FIG. 4 is a flow chart illustrating an example method 400 of reducing latency in UL positioning. Operation 410 includes receiving, from a location management function (LMF) of a network, user equipment (UE) priority indication data representing a list of proposed priority levels corresponding to a set of UEs being served requiring positioning data from the network. Operation 420 includes, after receiving the UE priority indication data, generating UE priority grant data indicating, for each of the set of UEs being served, whether there are sufficient resources to prioritize a transmission of a positioning signal by which the network may determine a position of that UE according to the proposed priority level corresponding to that UE.

Example 1-2: According to an example implementation of Example 1-1, wherein the method further comprises, after determining that there are sufficient resources to prioritize a positioning signal transmission by which the network may determine a position of a first UE in the network, transmitting reconfiguration data to the first UE, the reconfiguration data representing changes to values of parameters indicating a scheduling of transmissions of the positioning signal by the UE.

Example 1-3: According to an example implementation of Example 1-2, wherein the reconfiguration data represents instructions to reduce a periodicity of the positioning signal.

Example 1-4: According to an example implementation of Examples 1-2 or 1-3, wherein the reconfiguration data represents instructions to increase a positioning signal repetition number and decreasing a comb size.

Example 1-5: According to an example implementation of any of Examples 1-1 to 1-4, wherein the positioning signal includes a sounding reference signal (SRS).

Example 1-6: According to an example implementation of any of Examples 1-1 to 1-5, wherein the method further comprises determining a load on the network being served by the apparatus, the load determined indicating whether there are sufficient resources to prioritize a positioning signal transmission for each of the set of UEs being served according to the proposed priority levels corresponding to the set of UEs.

Example 1-7: According to an example implementation of any of Examples 1-1 to 1-6, wherein the priority levels are binary and include HIGH_PRIORITY and NOT_HIGH_PRIORITY.

Example 1-8: An apparatus comprising means for performing a method of any of Examples 1-1 to 1-7.

Example 1-9: A computer program product including a non-transitory computer-readable storage medium and storing executable code that, when executed by at least one data processing apparatus, is configured to cause the at least one data processing apparatus to perform a method of any of Examples 1-1 to 1-7.

Figure 5:
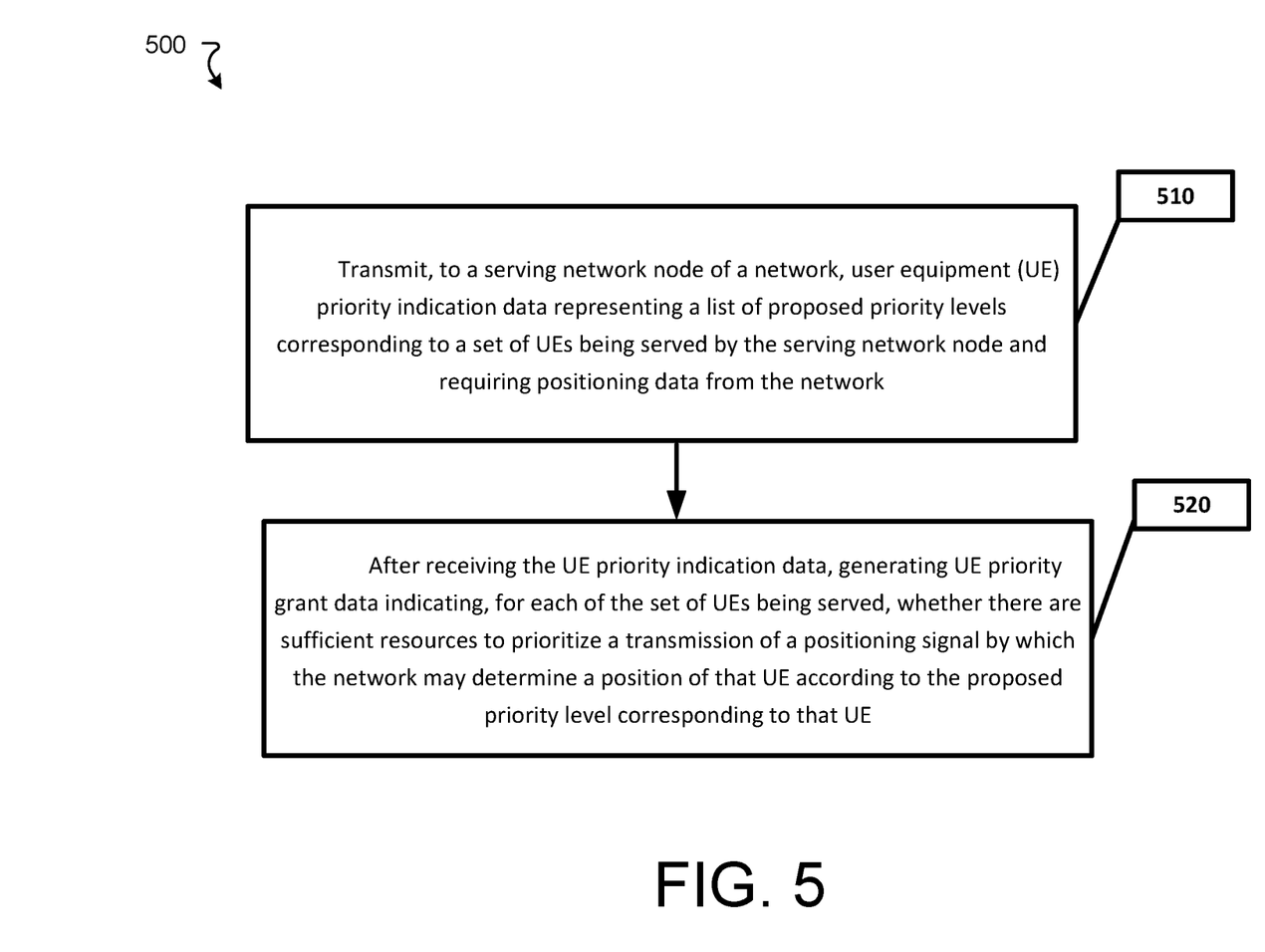
FIG. 5 is a flow chart illustrating a process of reducing latency in UL positioning according to an example implementation.

Example 2-1: FIG. 5 is a flow chart illustrating a process 500 of reducing latency in UL positioning. Operation 510 includes transmitting, to a serving network node of a network, user equipment (UE) priority indication data representing a list of proposed priority levels corresponding to a set of UEs being served by the serving network node and requiring positioning data from the network. Operation 520 includes receiving, from the serving network node, UE priority grant data indicating, for each of the set of UEs being served by the serving network node, whether there are sufficient resources for the serving network node to prioritize a transmission of a positioning signal by which the network may determine a position of that UE according to the proposed priority level corresponding to that UE.

Example 2-2: According to an example implementation of Example 2-1, wherein the method further comprises, in response to the UE priority grant data, transmit, to each of a set of transmission and reception points (TRPs) of the network, requesting data representing a request to obtain, for that TRP, a receive (RX) configuration of positioning signals for generating positioning data representing positions of the set of UEs in the network.

Example 2-3: According to an example implementation of Example 2-2, wherein the RX configuration of positioning signals for each of the set of TRPs of the network includes a number of receive beams.

Example 2-4: According to an example implementation of Examples 2-2 or 2-3, wherein the RX configuration of positioning signals for each of the set of TRPs of the network includes a beam switch time.

Example 2-5: According to an example implementation of any of Examples 2-2 to 2-4, wherein the RX configuration of positioning signals for each of the set of TRPs of the network includes a beam measurement duration.

Example 2-6: According to an example implementation of any of Examples 2-2 to 2-5, wherein the method further comprises receiving, from a TRP of the set of TRPs, configuration data for the TRP, the configuration data representing the configuration of positioning signals of the TRP; and generating, based on the configuration data for the TRP, a latency induced by the TRP in generating positioning data for each of the set of UEs having a priority level greater than a priority threshold.

Example 2-7: According to an example implementation of Example 2-6, wherein the method further comprises, in response to an estimate of the generated latency induced by the TRP being greater than a latency threshold, transmitting, to the TRP, the UE priority indication data to enable the TRP to perform a RX beam reconfiguration operation to reduce the latency induced by the TRP.

Example 2-8: According to an example implementation of Examples 2-6 or 2-7, wherein the method further comprises, in response to the generated latency induced by the TRP being greater than a latency threshold, causing the TRP to not generate positioning data for each of the set of UEs.

Example 2-9: According to an example implementation of Examples 2-6 to 2-8, wherein the method further comprises, in response to the generated latency induced by the TRP being greater than a latency threshold, causing the TRP to not generate positioning data for each of the set of UEs having the priority level be greater than the priority threshold.

Example 2-10: According to an example implementation of Examples 2-6 to 2-9, wherein the method further comprises, in response to the generated latency induced by the TRP being greater than a latency threshold: generating a new RX beam duration based on the generated latency; and transmit RX beam duration data to the TRP, the RX beam duration data representing the new RX beam duration by which the TRP may be reconfigured.

Example 2-11: According to an example implementation of Example 2-10, wherein the method further comprises transmitting RX beam priority data to the TRP, the RX beam priority data representing a RX beam priority list by which the TRP may be reconfigured.

Example 2-12: An apparatus comprising means for performing a method of any of Examples 2-1 to 2-11.

Example 2-13: A computer program product including a non-transitory computer-readable storage medium and storing executable code that, when executed by at least one data processing apparatus, is configured to cause the at least one data processing apparatus to perform a method of any of Examples 2-1 to 2-11.

List of Example Abbreviations

Figure 6:
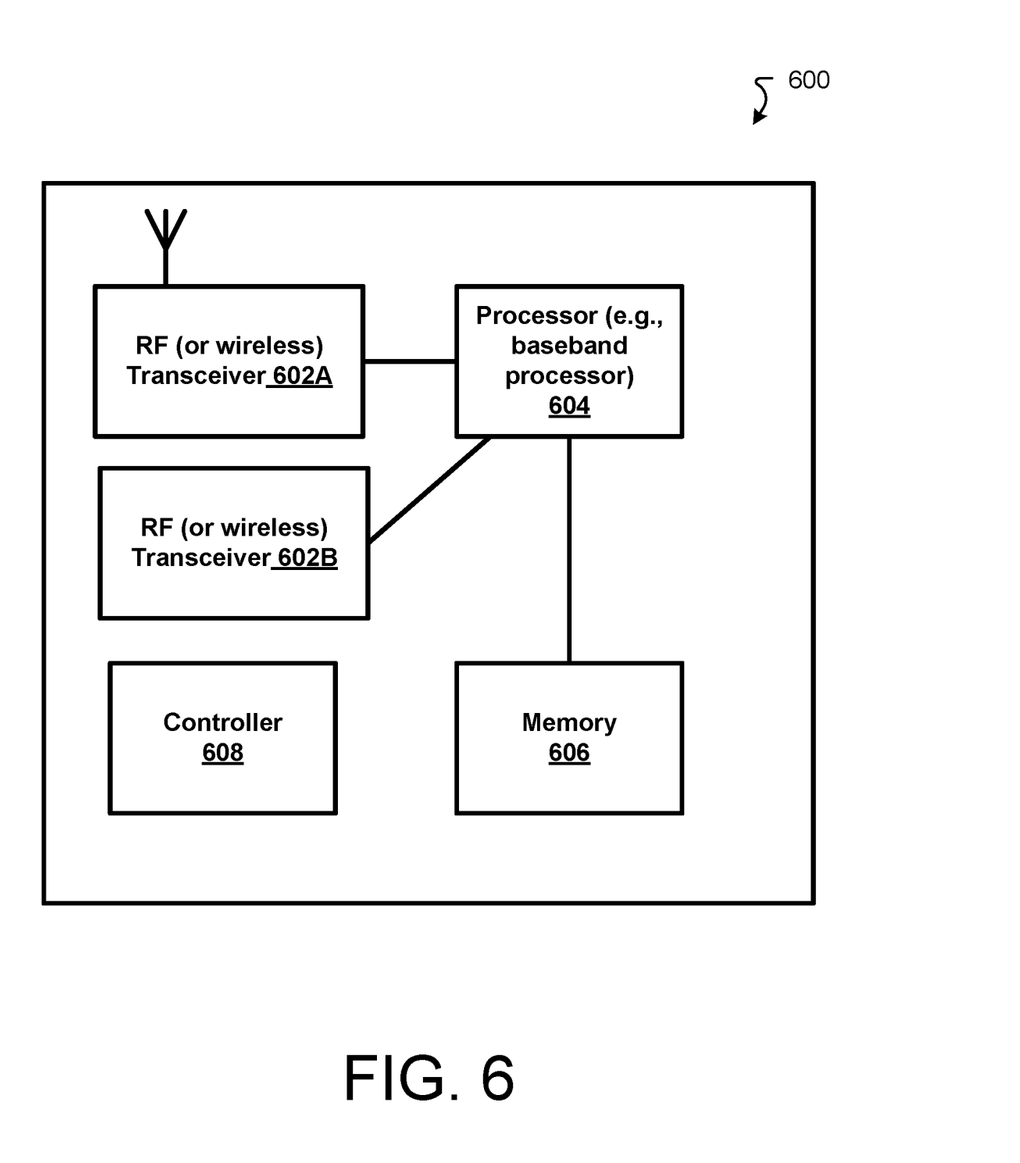
FIG. 6 is a block diagram of a node or wireless station (e.g., base station/access point, relay node, or mobile station/user device) according to an example implementation.

AoA Angle of Arrival (receiver side)
AoD Angle of Departure (transmitter side)
LMF Location Management Function
LOS Line of Sight
LPP LTE Positioning Protocol
NRPPa New Radio Positioning Protocol Annex
PRS Positioning Reference Signal
RAT Radio Access Technology
SRS Sounding Reference Signal
TRP Transmission Point FIG. 6 is a block diagram of a wireless station (e.g., AP, BS, e/gNB, NB-IoT UE, UE or user device) 600 according to an example implementation. The wireless station 600 may include, for example, one or multiple RF (radio frequency) or wireless transceivers 602A, 602B, where each wireless transceiver includes a transmitter to transmit signals (or data) and a receiver to receive signals (or data). The wireless station also includes a processor or control unit/entity (controller) 604 to execute instructions or software and control transmission and receptions of signals, and a memory 606 to store data and/or instructions.

Processor 604 may also make decisions or determinations, generate slots, subframes, packets or messages for transmission, decode received slots, subframes, packets or messages for further processing, and other tasks or functions described herein. Processor 604, which may be a baseband processor, for example, may generate messages, packets, frames or other signals for transmission via wireless transceiver 602 (602A or 602B). Processor 604 may control transmission of signals or messages over a wireless network, and may control the reception of signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6 such as controlling input/output devices (e.g., display, keypad), and/or may execute software for one or more applications that may be provided on wireless station 600, such as, for example, an email program, audio/video applications, a word processor, a Voice over IP application, or other application or software.

In addition, a storage medium may be provided that includes stored instructions, which when executed by a controller or processor may result in the processor 604, or other controller or processor, performing one or more of the functions or tasks described above.

According to another example implementation, RF or wireless transceiver(s) 602A/602B may receive signals or data and/or transmit or send signals or data. Processor 604 (and possibly transceivers 602A/602B) may control the RF or wireless transceiver 602A or 602B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:
   at least one processor; and
   at least one memory including computer program code;
   the at least one memory and the computer program code configured to cause the apparatus at least to:
      receive, from a location management function (LMF) of a network, user equipment (UE) priority indication data representing a list of proposed priority levels corresponding to a set of UEs being served requiring positioning data from the network;
      after receiving the UE priority indication data, generate UE priority grant data indicating, for each of the set of UEs being served, whether there are sufficient resources to prioritize a transmission of a positioning signal by which the network may determine a position of that UE according to the proposed priority level corresponding to that UE; and
      after determining that there are sufficient resources to prioritize a positioning signal transmission by which the network may determine a position of a first UE in the network, transmit reconfiguration data to the first UE, the reconfiguration data representing changes to values of parameters used for scheduling of transmissions of the positioning signal by the first UE.

2. The apparatus as in claim 1, wherein the reconfiguration data represents instructions to reduce a periodicity of the positioning signal.

3. The apparatus as in claim 1, wherein the reconfiguration data represents instructions to increase a positioning signal repetition number and decreasing a comb size.

4. The apparatus as in claim 1, wherein the positioning signal includes a sounding reference signal (SRS).

5. The apparatus as in claim 1, wherein the at least one memory and the computer program code configured to generate UE priority grant data further cause the apparatus at least to:
   determine a load on the network being served by the apparatus, the load determined indicating whether there are sufficient resources to prioritize a positioning signal transmission for each of the set of UEs being served according to the proposed priority levels corresponding to the set of UEs.

6. The apparatus as in claim 1, wherein the priority levels are binary and include HIGH_PRIORITY and NOT_HIGH_PRIORITY.

7. A method, comprising:
   receiving, from a location management function (LMF) in a network, user equipment (UE) priority indication data representing a list of proposed priority levels corresponding to a set of UEs being served requiring positioning data from the network;
   after receiving the UE priority indication data, generating UE priority grant data indicating, for each of the set of UEs being served, whether there are sufficient resources to prioritize a transmission of a positioning signal by which the network may determine a position of that UE according to the proposed priority level corresponding to that UE; and
   after determining that there are sufficient resources to prioritize a positioning signal transmission by which the network may determine a position of a first UE in the network, transmitting reconfiguration data to the first UE, the reconfiguration data representing changes to values of parameters used for scheduling of transmissions of the positioning signal by the first UE.

8. A computer program product including a non-transitory computer-readable storage medium and storing executable code that, when executed by at least one data processing apparatus, is configured to cause the at least one data processing apparatus to perform a method of claim 7.

9. An apparatus comprising means for performing a method according to claim 7.

10. An apparatus, comprising:
at least one processor; and
at least one memory including computer program code;
the at least one memory and the computer program code configured to cause the apparatus at least to:
transmit, to a serving network node of a network, user equipment (UE) priority indication data representing a list of proposed priority levels corresponding to a set of UEs being served by the serving network node and requiring positioning data from the network;
receive, from the serving network node, UE priority grant data indicating, for each of the set of UEs being served by the serving network node, whether there are sufficient resources for the serving network node to prioritize a transmission of a positioning signal by which the network may determine a position of that UE according to the proposed priority level corresponding to that UE; and
in response to the UE priority grant data, transmit, to each of a set of transmission and reception points (TRPs) of the network, request data representing a request to obtain, for that TRP, a receive (RX) configuration of positioning signals for generating positioning data representing positions of the set of UEs in the network.

11. The apparatus as in claim 10, wherein the RX configuration of positioning signals for each of the set of TRPs of the network includes a number of receive beams.

12. The apparatus as in claim 10, wherein the RX configuration of positioning signals for each of the set of TRPs of the network includes a beam switch time.

13. The apparatus as in claim 10, wherein the RX configuration of positioning signals for each of the set of TRPs of the network includes a beam measurement duration.

14. The apparatus as in claim 10, wherein the at least one memory and the computer program code are further configured to cause the apparatus at least to:
receive, from a TRP of the set of TRPs, configuration data for the TRP, the configuration data representing the configuration of positioning signals of the TRP; and
generate, based on the configuration data for the TRP, a latency induced by the TRP in generating positioning data for each of the set of UEs having a priority level greater than a priority threshold.

15. The apparatus as in claim 14, wherein the at least one memory and the computer program code are further configured to cause the apparatus at least to:
in response to the generated latency induced by the TRP being greater than a latency threshold, transmit, to the TRP, the UE priority indication data to enable the TRP to perform a RX beam reconfiguration operation to reduce the latency induced by the TRP.

16. The apparatus as in claim 14, wherein the at least one memory and the computer program code are further configured to cause the apparatus at least to:
in response to the generated latency induced by the TRP being greater than a latency threshold, causing the TRP to not generate positioning data for each of the set of UEs.

17. The apparatus as in claim 14, wherein the at least one memory and the computer program code are further configured to cause the apparatus at least to:
in response to the generated latency induced by the TRP being greater than a latency threshold, causing the TRP to not generate positioning data for each of the set of UEs having the priority level be greater than the priority threshold.

18. The apparatus as in claim 14, wherein the at least one memory and the computer program code are further configured to cause the apparatus at least to:
in response to the generated latency induced by the TRP being greater than a latency threshold:
generating a new RX beam duration based on the generated latency; and
transmit RX beam duration data to the TRP, the RX beam duration data representing the new RX beam duration by which the TRP may be reconfigured.

19. The apparatus as in claim 18, wherein the at least one memory and the computer program code are further configured to cause the apparatus at least to:
transmit RX beam priority data to the TRP, the RX beam priority data representing a RX beam priority list by which the TRP may be reconfigured.

20. A method, comprising:
transmitting, to a serving network node of a network, user equipment (UE) priority indication data representing a list of proposed priority levels corresponding to a set of UEs being served by the serving network node and requiring positioning data from the network;
receiving, from the serving network node, UE priority grant data indicating, for each of the set of UEs being served by the serving network node, whether there are sufficient resources for the serving network node to prioritize a transmission of a positioning signal by which the network may determine a position of that UE according to the proposed priority level corresponding to that UE; and
in response to the UE priority grant data, transmitting, to each of a set of transmission and reception points (TRPs) of the network, request data representing a request to obtain, for that TRP, a receive (RX) configuration of positioning signals for generating positioning data representing positions of the set of UEs in the network.

* * * * *